Jan. 20, 1925. 1,523,662
E. SCHNEIDER
GUN CARRIAGE AND SIGHTING APPARATUS OF FIELD GUNS FOR
CORRECTING THE VARYING TRANSVERSE AND LONGITUDINAL
INCLINATIONS OF THE GUN CARRIAGES
Filed Jan. 5, 1924 11 Sheets-Sheet 2
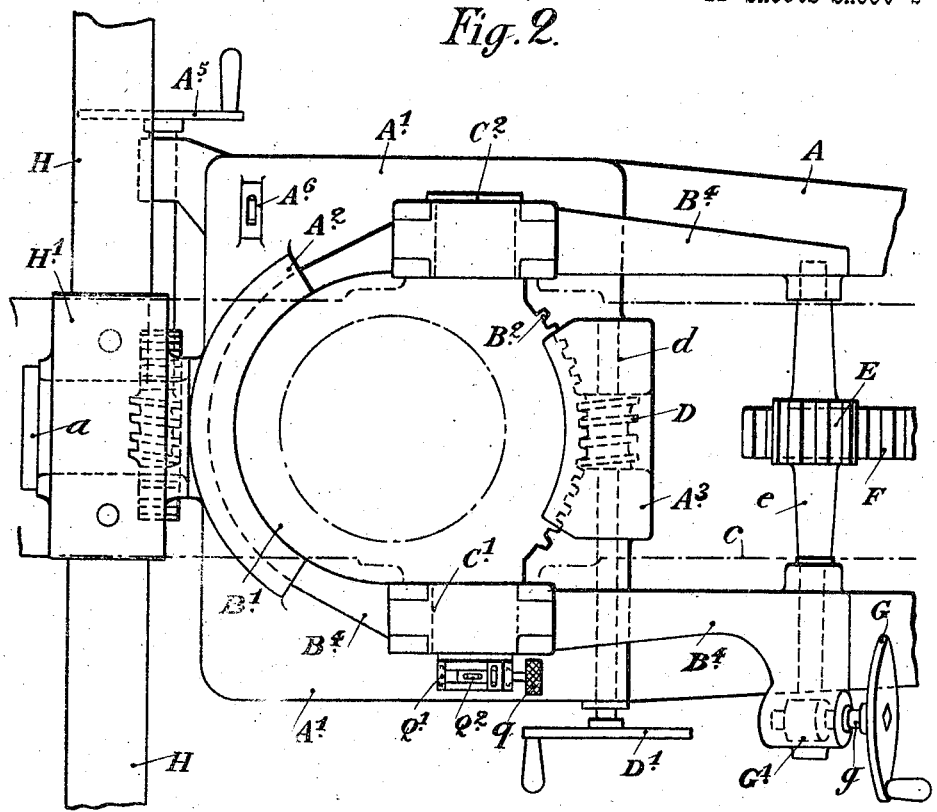
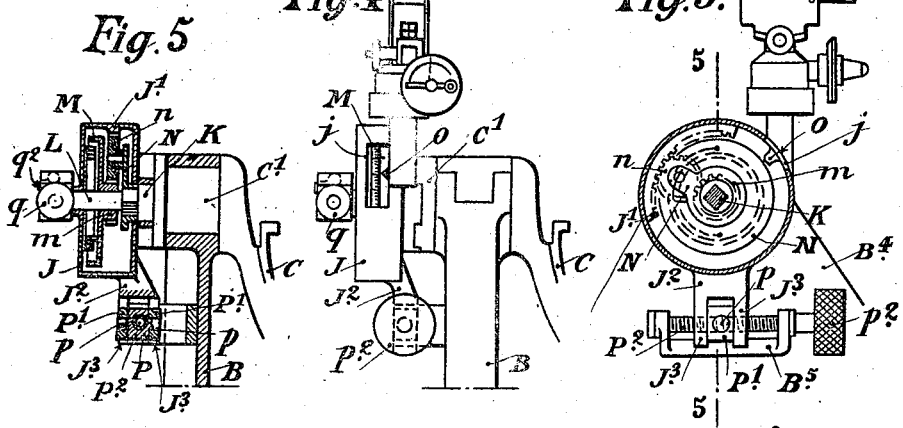
Inventor:—
Eugene Schneider
By Mauro, Cameron, Lewis &
Kerkam
Attorneys

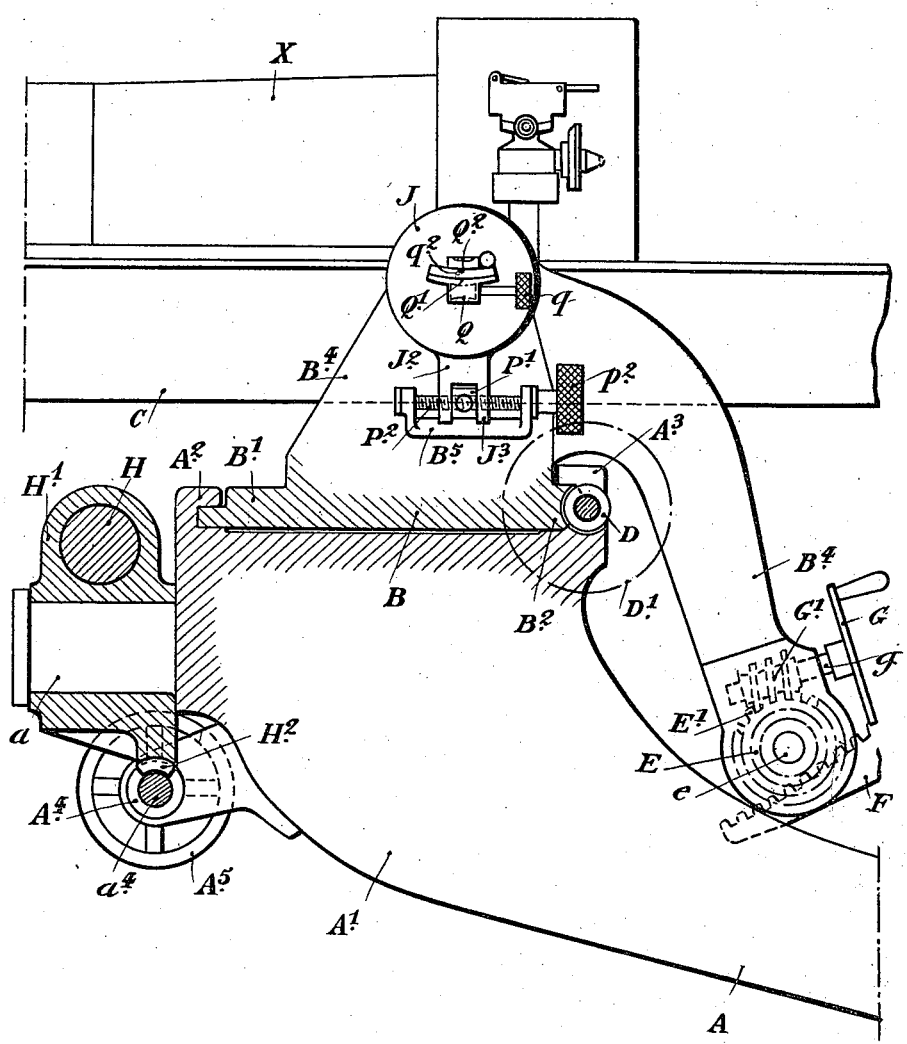

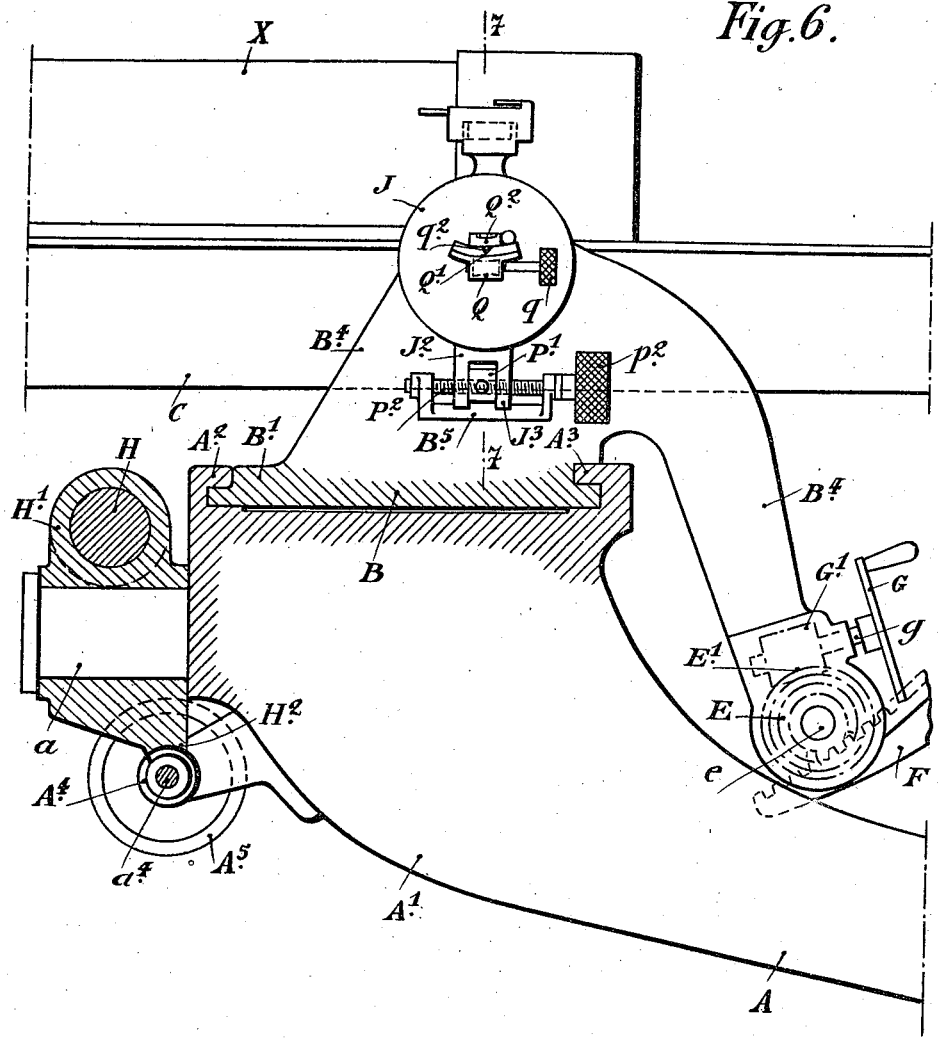

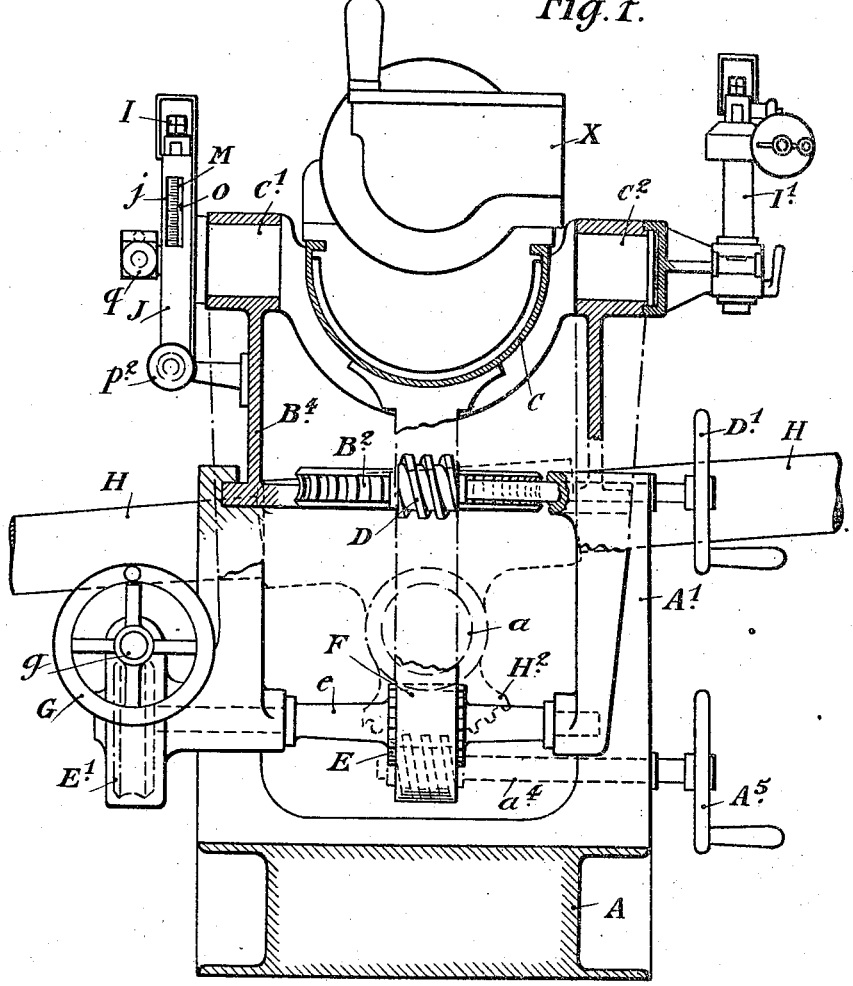

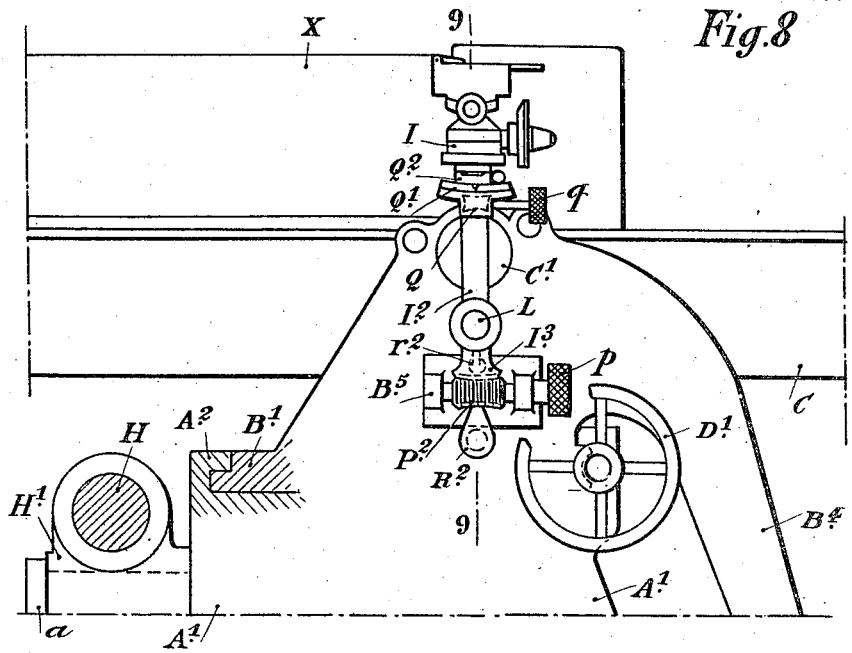
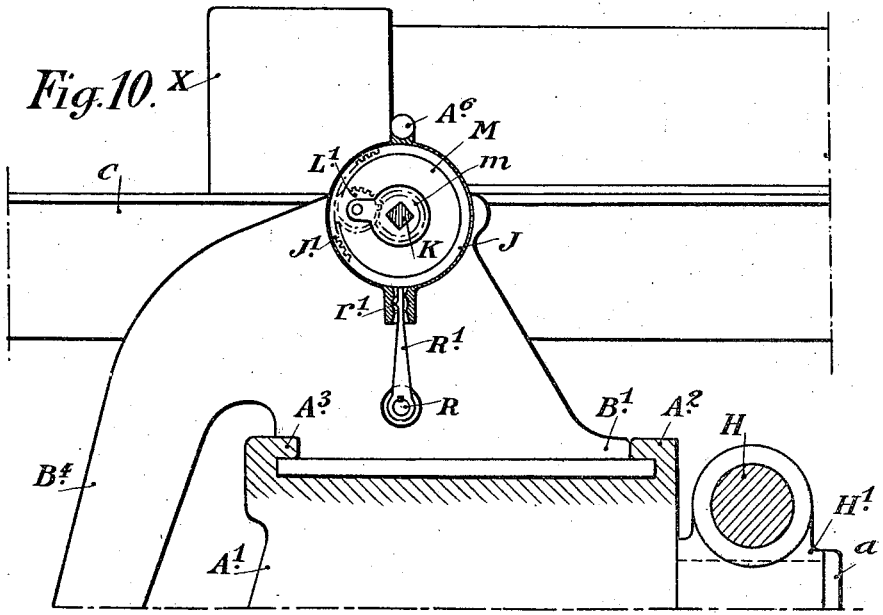

Jan. 20, 1925.  1,523,662
E. SCHNEIDER
GUN CARRIAGE AND SIGHTING APPARATUS OF FIELD GUNS FOR
CORRECTING THE VARYING TRANSVERSE AND LONGITUDINAL
INCLINATIONS OF THE GUN CARRIAGES
Filed Jan. 5, 1924      11 Sheets-Sheet 6

Jan. 20, 1925.   1,523,662

E. SCHNEIDER

GUN CARRIAGE AND SIGHTING APPARATUS OF FIELD GUNS FOR
CORRECTING THE VARYING TRANSVERSE AND LONGITUDINAL
INCLINATIONS OF THE GUN CARRIAGES

Filed Jan. 5, 1924   11 Sheets-Sheet 7

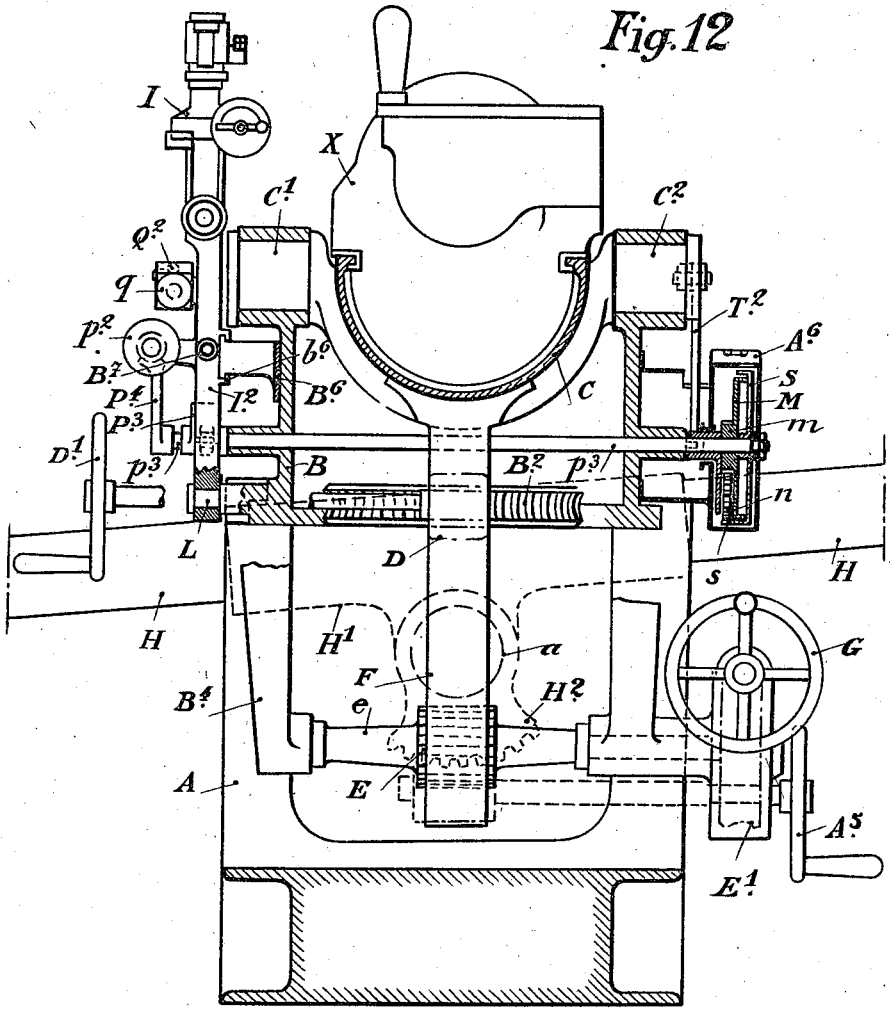

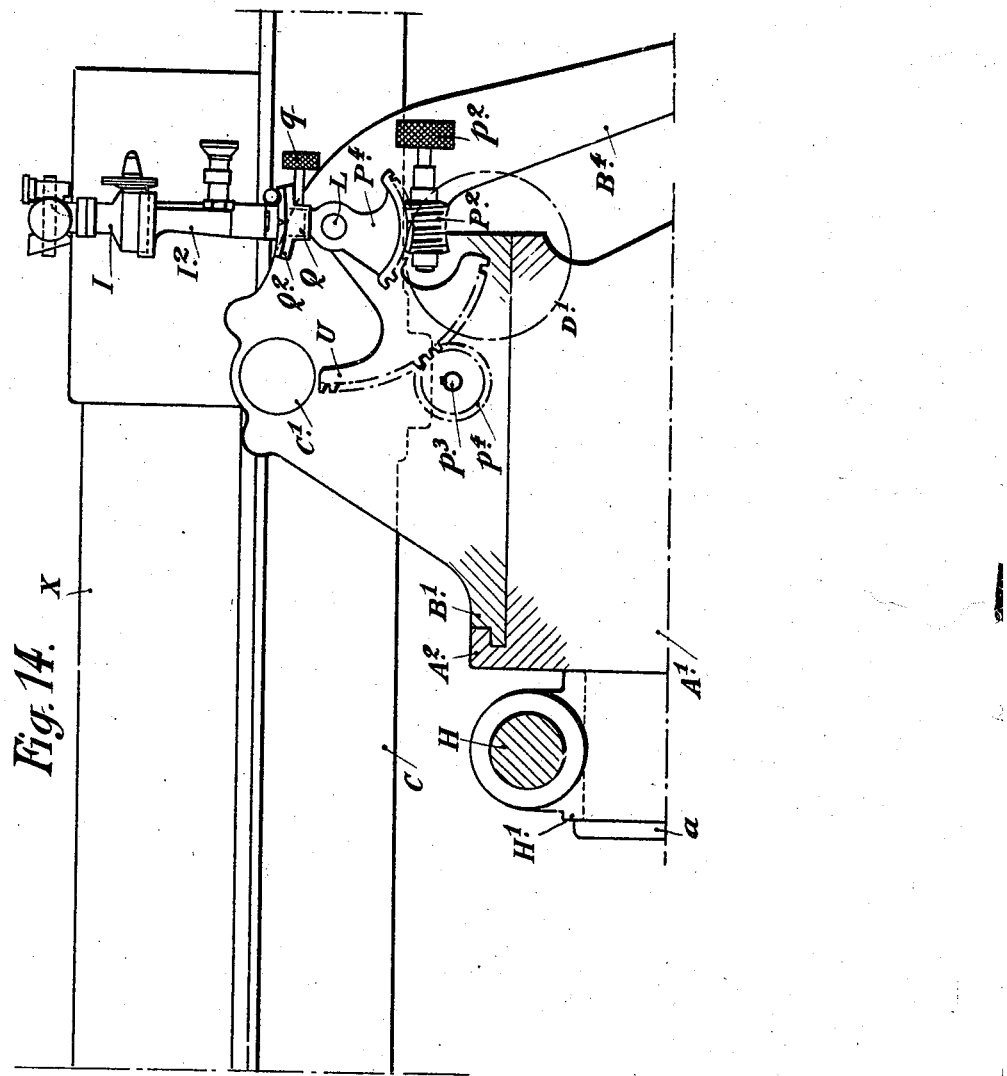

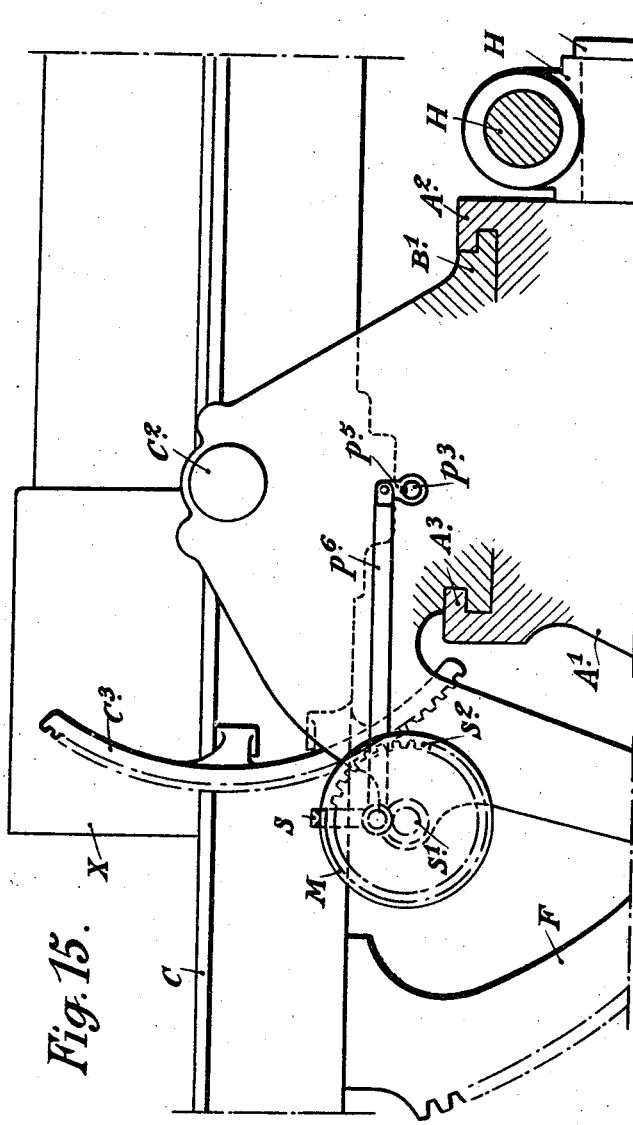

Patented Jan. 20, 1925.

1,523,662

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT STOCK COMPANY OF FRANCE.

GUN CARRIAGE AND SIGHTING APPARATUS OF FIELD GUNS FOR CORRECTING THE VARYING TRANSVERSE AND LONGITUDINAL INCLINATIONS OF THE GUN CARRIAGES.

Application filed January 5, 1924. Serial No. 684,668.

*To all whom it may concern:*

Be it known that I, EUGÈNE SCHNEIDER, a citizen of the Republic of France, resident of Paris, France, have invented new and useful Improvements in and Relating to the Gun Carriages and Sighting Apparatus of Field Guns for Correcting the Varying Transverse and Longitudinal Inclinations of the Gun Carriages, which is fully set forth in the following specification.

It is known that field guns must be capable of being brought into battery position on ground of varying transverse and longitudinal contour. Further, in firing, an unequal subsidence of the two wheels of the gun carriage produces a varying inclination of the axis of the cradle trunnions and a corresponding deviation in the aim. Moreover, a subsidence of the gun in the longitudinal direction due to the sinking in of the wheels and the trail spade is also liable to occur, and does frequently occur. Consequently for a suitable placing into battery position as well as for the correct execution of consecutive firings, it is necessary to be able to give at all time to the axis of the gun barrel a direction which takes into consideration the varying transverse inclination of the gun cradle trunnions, and the varying positions of the gun carriage in the longitudinal direction.

In solving this double problem, one or other of the two methods hereinafter described have hitherto been employed.

1. In the great majority of cases use is made of a sighting apparatus, which is adapted to the gun and is so designed as to be capable, by two distinct mechanisms, to be constantly returned first into a vertical plane when the gun has become transversely inclined, and, then uprighted in the said plane when the gun has become inclined as a result of a longitudinal subsidence. The corrections of the position of the axis of the gun barrel are effected finally by acting upon the training and elevating mechanisms, the corrections being made when the sighting line of the sighting apparatus and the graduations of elevations scale have resumed their initial positions.

That known means complicates considerably the design and construction of the sighting apparatus as well as the manœuvers to be performed by means of the aiming mechanisms.

2. In order to avoid those complications it has already been proposed to so design the actual gun carriage as to enable the training pivot of the gun mount (in which the gun cradle is trunnioned) to be constantly returned into a vertical position.

That last design necessitates the use of one mechanism for effecting the transverse uprighting of the gun mount, and of a second mechanism for effecting its uprighting in a longitudinal sense. The above described simplification of the aiming operations, and of the construction and design of the sighting apparatus, has however the counter-drawback that the additional mechanisms render the gun heavier and more cumbersome.

Now, compared with the second one of the known designs, the improvements of the present invention diminish considerably the complication and the cumbersomeness due to the additional mechanisms placed upon the gun carriage; and compared with the first one of the hereinabove mentioned designs, the present improvements simplify considerably the aiming operations.

According to this invention the improved design comprises, in combination with a mechanism for effecting the transverse uprighting of the gun mount, a sighting apparatus designed and constructed to allow of effecting the corrections necessitated by the longitudinal inclinations of the gun.

By returning constantly into a vertical plane the pivot of the gun mount by means of a single uprighting mechanism, and by acting directly upon the gun carriage, the aiming operation is facilitated in the highest degree because the gun cradle is caused to turn always on a horizontal axis. Therefore there remains merely to correct through the medium of the sighting apparatus only the longitudinal inclinations which are very slight in most cases.

Various examples of a field gun embodying the present improvements are illustrated in the accompanying drawings in which:—

Figures 1 to 5 inclusive illustrate a first constructional form of the improved gun carriage.

Figure 1 is a longitudinal side elevation partly in section.

Figure 2 is a plan thereto, after removal of the gun barrel and the cradle.

Figure 3 is a partial detail sectional elevation of the sighting apparatus and its connection to the gun mount and one of the cradle trunnions.

Figure 4 is a corresponding end elevation.

Figure 5 is a section taken along the line 5—5 of Figure 3.

Fig. 6 is a longitudinal sectional elevation illustrating another embodiment of the present invention;

Fig. 7 is a section on the line 7—7 of Fig. 6;

Fig. 8 is a longitudinal sectional elevation disclosing another embodiment of the invention;

Fig. 10 is a section on the line 10—10 of Fig. 9;

Fig. 12 is an end elevation partly in section and Figure 13 is a view similar to Fig. 11 at the opposite side of the gun;

Fig. 14 is a longitudinal elevation disclosing another embodiment of the invention, viewed from the left-hand side of the gun;

Fig. 15 is a longitudinal elevation of the gun of Fig. 14, viewed from the right-hand side;

Figure 17:
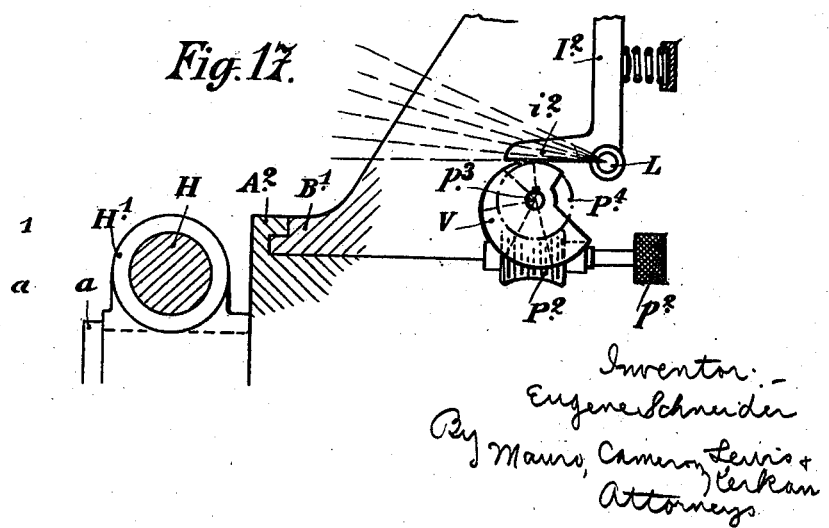

Fig. 17 is an elevation of mechanism for imparting angular displacement to sighting apparatus, Referring to Figures 1 to 5, inclusive A is the wheeled or lower carriage of a field gun of any known type. In the illustrated example this carriage is assumed to be constituted by a single trail the tail of which is provided with the usual anchor. The gun mount or upper carriage B is adapted to turn on the head $A^1$ of the said trail for the purpose of training the gun. This turning may be effected by the usual means; for instance as shown in the drawings, by turning on an imaginary axis by guiding the circular base $B^1$ of the gun mount in guides or grooves $A^2$, $A^3$ formed on the trail head $A^1$. The cradle C on which the gun barrel X is adapted to recoil is trunnioned in the gun mount B in the usual manner by means of trunnions $C^1$, $C^2$.

The elevating and training mechanisms are of any known type. Thus the training movement may be produced by means of a worm D whose axle $d$ is journalled in the guide $A^3$ and in the trail head. The worm D which is operated by means of a handle wheel $D^1$ meshes with a worm wheel sector $B^2$ formed on the base of the gun mount B. The elevating movement may be produced by an elevating sector F, fixed to the cradle C, being caused to roll over the pinion E whose axle $e$ is journalled in side plates $B^4$ of the gun mount. This rolling motion may be produced by operating a hand wheel G fixed on the axle $g$ of a worm $G^1$ meshing with a worm wheel $E^1$ fixed on the axle $e$.

According to this invention the devices for assuring the transverse and longitudinal uprighting movements are distributed between the gun barrel and the sighting apparatus, the transverse upright mechanism acting alone directly upon the gun carriage, whereas the longitudinal uprighting, or, more accurately speaking, the correction necessitated by reason of a longitudinal subsidence is made by means of an elevating movement given to the gun cradle after an uprighting movement has been performed on the sighting apparatus.

In order to enable the correction necessitated by reason of a transverse inclination of the axis of the cradle trunnions due to an unequal sinking-in of the gun carriage wheels, the combined trail A and the parts carried by it are rendered transversely movable relatively to the road wheel axle H. For instance as shown in Figures 1 and 2, the trail A may be pivoted by means of a pivot-pin $a$ in a sleeve $H^1$ secured to the road wheel axle H, the said pivot-pin being held stationary during the firing by a kinematic connection between the trial A and the sleeve $H^1$. The rotational movements of the pivot pin $a$, for the purpose of effecting a transverse uprighting of the trail, may be produced, for instance by means of a worm $A^4$ whose axle $a^4$ is journalled in bearings formed on the trail head $A^1$, and is adapted to move over a worm wheel sector $H^2$ formed on the sleeve $H^1$ and having its centre on the axis of the pivot pin $a$. By operating a hand wheel $A^5$ so as to bring between its marks the air bubble of a liquid level $A^6$ secured to the trail head, a gun server situated on the right of the gun assures constantly the return of the axis of the cradle trunnions into the horizontal position.

The sighting apparatus proper, of any known type is carried by a supporting box J journalled in the known manner on an arm K secured to the cradle trunnion $C^1$. The arm K is prolonged in the form of an axle L serving as a pivot for the elevations-drum M which is movable in the interior of the box J. The scale divisions of the said drum are adapted to move in front of a window $j$ and a fixed register mark O provided on the box J. A kinematic connection is established between the elevations-drum M and the box J through the medium of a satellite $n$ which is mounted on an axle pin $N^1$ carried by an arm N fixed rigidly on the arm K. This kinematic connection serves to facilitate the reading of the elevations, whilst assuring an amplification of the motion of the trunnion of the gun cradle C. The angle through which the drum M moves for varying the elevation, is thus a multiple of the angle through which move the cradle and the gun barrel. The kinematic connection is effected by a pinion $m$ formed in one with the drum M and meshing with the satellite wheel $n$ which meshes in its turn with a toothed sector $J^1$ formed on the box J. This box J carries an "appendix" $J^2$ terminating in a fork between the prongs $J^3$ of which there is adapted to slide, by means of slide-blocks $P^1$, a nut P which is in its turn movable in the said slide-blocks by means of trunnions $p$. The nut P is mounted on a screw $P^2$ which is journalled in a bearing $B^5$ formed on one of the side plates $B^4$ of the gun mount B. The screw $P^2$ is operated by means of a knurled head $p^2$. On the box J there is mounted an apparatus for indicating the site angles. This known apparatus comprises a worm Q operated by means of a knurled head $q$ and meshing with a worm wheel sector $Q^1$ fixed to a spirit level $Q^2$ carrying a movable register mark or pointer $q^2$ in front of a divided scale formed on an arc that is concentric to the worm wheel sector $Q^1$.

In the case of a longitudinal subsidence of the gun carriage the line of sight is no longer directed on to the target or the selected register mark. For the purpose of giving to the gun barrel the correction required by reason of the longitudinal subsidence, the sighting apparatus is returned into the vertical position for operating the knurled head $p^2$. The vertical return is assured when the bubble of the level $Q^2$ is moved back between its register marks. In this movement the box J is carried along, and through the medium of the multiplying transmission $J^1$—$n$—$m$ the elevations drum M is shifted through a suitably multiplied corresponding angle. The consequence is that the selected elevation graduation has become shifted relatively to the fixed register mark O. If now the elevating mechanism be operated by means of the hand wheel G so as to bring in front of the register mark O the elevation division mark selected for a particular target, the elevation of the gun barrel is corrected by the amount of the requisite angle.

Whereas in the other known designs, for the purpose of making the corrections for the transverse and longitudinal inclinations, the support for the sighting apparatus is jointed to the cradle trunnion by means of an axle parallel to the axis of the gun barrel, it is to be noted that in the improved construction the uprighting of the sighting apparatus i. e. its return into a vertical plane, is effected by the simple transverse uprighting of the trail. This feature simplifies considerably the design and construction of the sighting apparatus.

As regards design such as those described in French Patent No. 537500 of 11 December 1920, wherein the corrections required by reason of the transverse inclination of the trunnions and the longitudinal subsidence are effected entirely by means of mechanisms acting directly upon the gun carriage independently of the elevating mechanism, the present improved design represents a great simplification of the mechanisms as well as a considerable reduction in the weight of the gun.

In the hereinbefore described constructional form the mechanism have been grouped in such a way that a gun server on the left side of the gun controls the elevating mechanism, the training mechanism and the sighting apparatus, and consequently also the operations for longitudinal uprighting. A gun server on the right side of the gun has solely to operate the hand wheel $A^5$ for the transverse uprighting of the gun carriage by observing the spirit level $A^6$ carried by the gun carriage.

One drawback of this design is that it places a too great responsibility upon the left hand gun server.

In the embodiment illustrated in Figures 6 and 7, the left hand gun server retains the control of the elevating mechanism by means of the hand wheel G whose movements are transmitted as in the preceding constructional example, by a pinion E meshing with an aiming sector F. The right hand gun server controls the training of the gun which is effected by means of a hand wheel $D^1$ acting upon a worm D meshing with a worm wheel sector $B^2$ formed on the base of the gun mount B. The same gun server has charge of the mechanism for effecting the transverse uprighting of the gun carriage. This mechanism (as in the preceding example) comprises a hand-wheel $A^3$ whose axle, journalled in the trail head $A^1$, carries a worm $A^4$ meshing with a worm wheel sector $H^2$ formed on the road-axle sleeve $H^1$ in which is engaged the pivot pin $a$ secured to the trail A.

Here the sighting apparatus is divided into two elements: the left hand element comprises a supporting box J having an internal organization similar to that shown in Figures 3, 4 and 5. This box J carries, as in the preceding example, the apparatus $Q$—$Q^2$ for indicating the site angles. The sighting apparatus proper I, instead of being so designed as to enable the gun layer to sight in elevation as well as in training, has its axis always in a plane parallel to the axis of the gun barrel, and can move only in the vertical plane. The right hand gun server has on the contrary under his control a sighting apparatus I¹ attached to the gun mount B, which enables him to train the gun.

Figure 9:
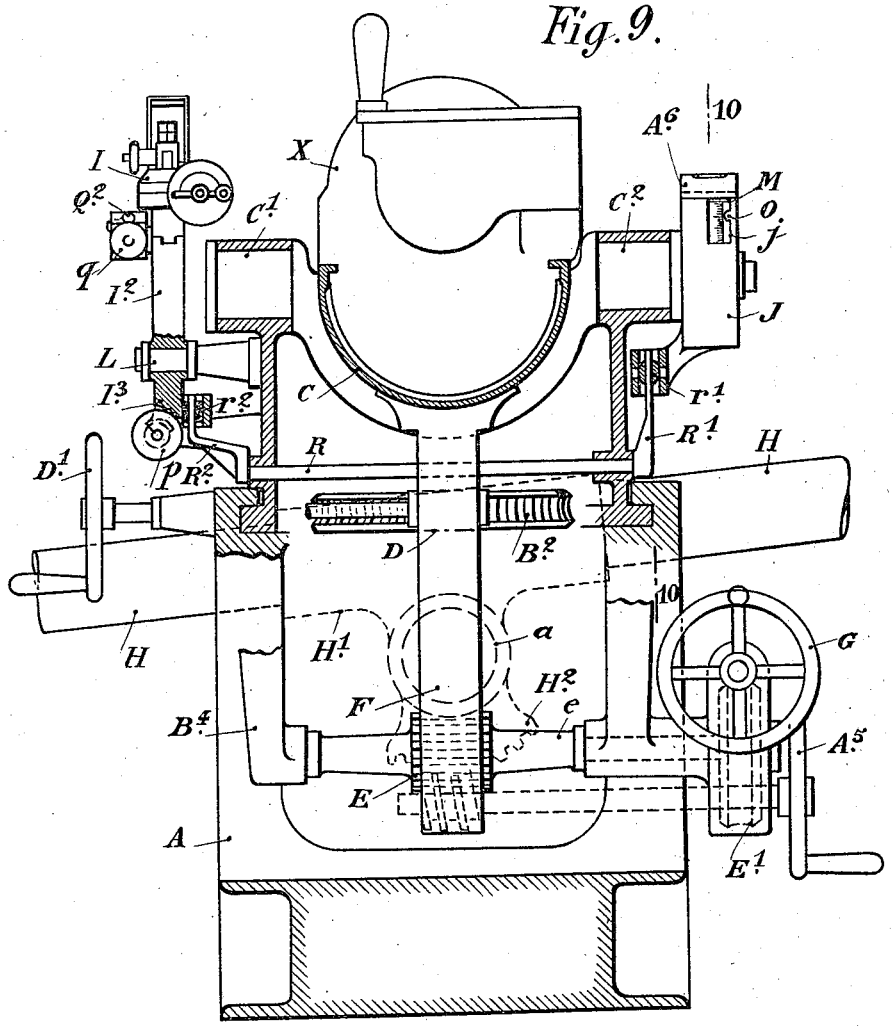
Fig. 9 is a section on the line 9—9 of Fig. 8.

In the embodiment shown in Figures 8 to 10, inclusive, the connection between the gun carriage and the road wheel axle is the same as in the preceding examples, that is to say, only the transverse uprighting is effected by means of a mechanism acting upon the gun carriage. This mechanism which is similar to the one just hereinbefore described, is operated by means of a hand wheel A⁵ under the control of a right hand gun server. This same gun server controls the elevating mechanism by means of a hand wheel G whose movements are transmitted likewise in the same manner as in the preceding examples, to a pinion E meshing with the elevating sector F. In this constructional form the training is under the control of a left hand gun server who, by means of a hand wheel D¹ actuates the worm D, and through the latter the worm wheel sector B².

All the sightings are entrusted here to the left hand gun server who has under his charge a sighting apparatus I movable in the training direction the supporting bracket I² of which is movable in its turn in a plane parallel to the axis of the gun barrel on a pivot pin L projecting from one of the side plates of the gun mount B. The bracket I² carries the apparatus Q—Q² for reading the sight angles. The left hand gun server has under its control the mechanism for effecting the longitudinal uprighting of the sighting apparatus; the said mechanism is operated by means of the knurled head $p^2$ which drives a worm P² meshing with a worm wheel section I³, formed on the underside of the bracket I².

The apparatus for reading the tangent elevations may be in all respects similar to that shown in detail in Figures 3 to 5; it is mounted on the right hand trunnion C² of the cradle, and its supporting box J carries externally the spirit level A⁶ that serves for checking the verticality of the pivot of the gun mount B. The box J which, as is to be understood, must receive all the movements for describing the site angles given to the bracket I² of the sighting apparatus, is for this purpose connected kinematically to the said bracket, for instance as shown in the drawings, by means of a shaft R journalled in the side plates of the gun mount B, and provided at its ends with two fingers R¹, R² of which one (R¹) is engaged in a ball-and-socket joint $r^1$, formed on the box J, and the other (R²) is engaged in a ball-and-socket $r^2$ formed in a bracket I².

It will be perceived that any displacement given to the bracket I² is transmitted to the box J, and through the latter to the tangent elevation drum M by means of the kinematic connection J¹—L¹—m (Fig. 10). The right hand gun server must always return the given scale division of tangent elevations to the front of the fixed register mark O by actuating for this purpose the elevating hand wheel G.

Figure 11:
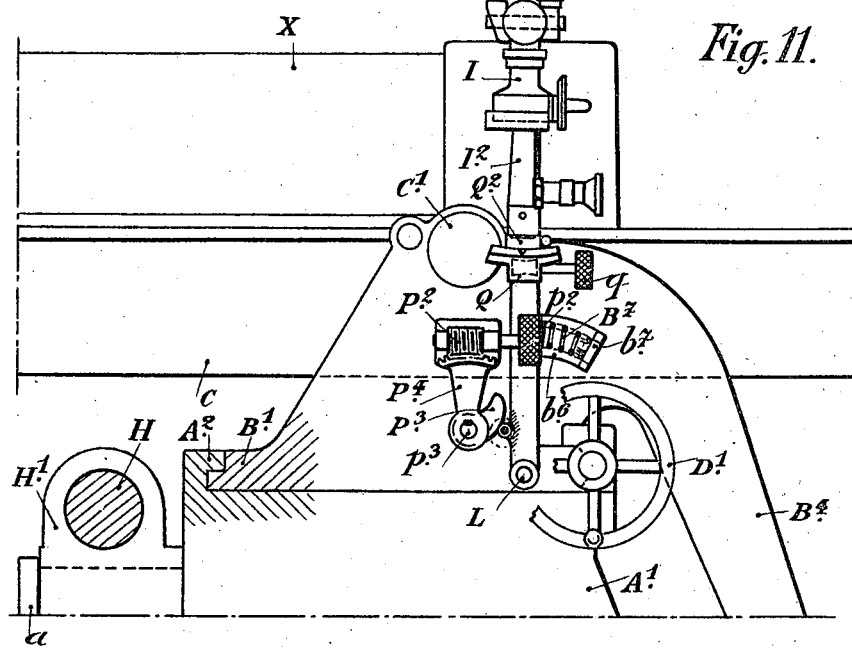
Fig. 11 is a longitudinal sectional elevation of another embodiment of the invention.
Figure 13:
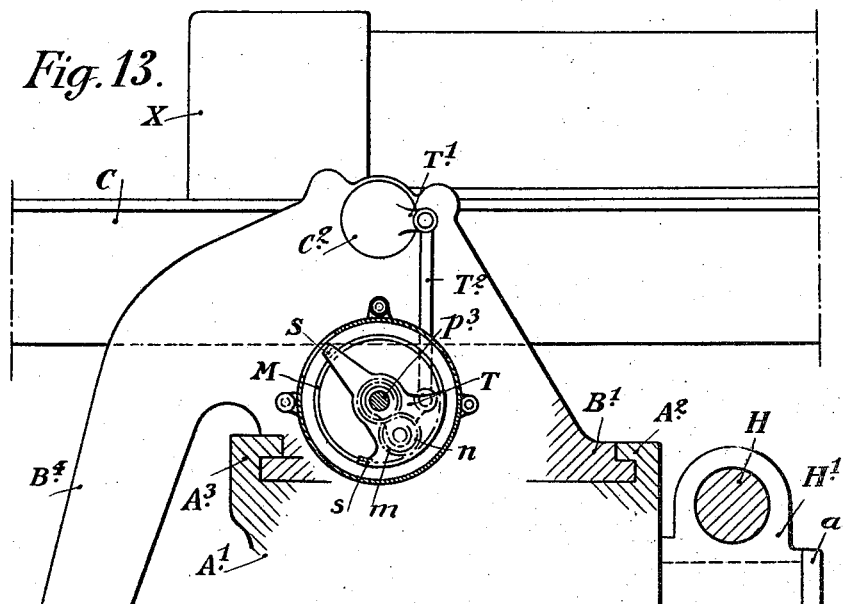

Figures 11, 12 and 13 illustrate a constructional form wherein the distribution of the operations is exactly the same as in the preceding example. The right hand gun server controls, by means of the hand wheel G, the elevation of the gun barrel, and he also controls by means of the hand wheel A⁵, the mechanism for effecting the transverse uprighting of the gun carriage. The left hand gun server has under his control the training of the gun by means of the hand wheel D¹.

The apparatuses for sighting, for indicating the site angles and indicating the tangent elevation are distributed in the same manner as in the preceding example. The bracket I², carrying the sighting apparatus proper I is pivoted, for the purpose of moving in a plane parallel to the firing plane, on a pivot pin L projecting from the gun mount B. The pivoted bracket I² is guided in slideways $b^6$ formed on a bracket B⁶ secured to the gun mount B. It bears constantly at its rear end against one end of a spring B⁷ whose other end bears against a fixed point $b^7$ of the bracket B⁶. At its forward end the bracket I² bears on a finger P³ fixed on an axle $p^3$ journalled in the side plates of the gun mount B. On this axle $p^3$ there is fixed a toothed sector P⁴ meshing with a worm P² operated by means of a knurled head $p^2$. The uprighting of the bracket I² into the vertical plane is effected by operating this head $p^2$. This operation produces, by the rotation of the axle $p^3$ an angular displacement of a pointer S mounted on the opposite end of the said axle and connected kinematically to the tangent elevation plate.

This connection is effected by means of a sector $s$ formed on an extension of the pointer S, meshing with a satellite wheel $n$ mounted on a pin carried by one side of a jointed parallelogram which is composed of a lever I pivoted on the axle $p^3$, a parallel lever T¹ pivoted on the gun cradle trunnion, and a link T² between these two levers. A pinion $n$ meshes with a pinion $m$ which is fixed to the tangent elevation plate M and is loose on the axle $p^3$.

It will be readily perceived that any site-angle displacement imparted to the bracket I² by means of the knurled head $p^2$, produces through the medium of the transmission $P^2$, $P^4$, $p^3$, a displacement of the pointer S and of the sector s; the angular difference between the positions of the pointer S and the tangent-elevation drum M being multiplied by the transmission gear s—n. On the whole, for a given angular displacement of the bracket $I^2$ the angular difference between the positions of the pointer S and the tangent-elevation plate is equal to the displacement given to the pointer increased by the displacement given to the drum M by the multiplying transmission gear s—m—n, the axis of the wheel n remaining stationary. Similarly, for every displacement in elevation around the axis of the gun cradle trunnion, the tangent-elevation drum M receives a displacement that is amplified in the same ratio, owing to the rolling of the satellite wheel n over the sector s that is secured to the register mark S which then remains stationary.

Figure 16:
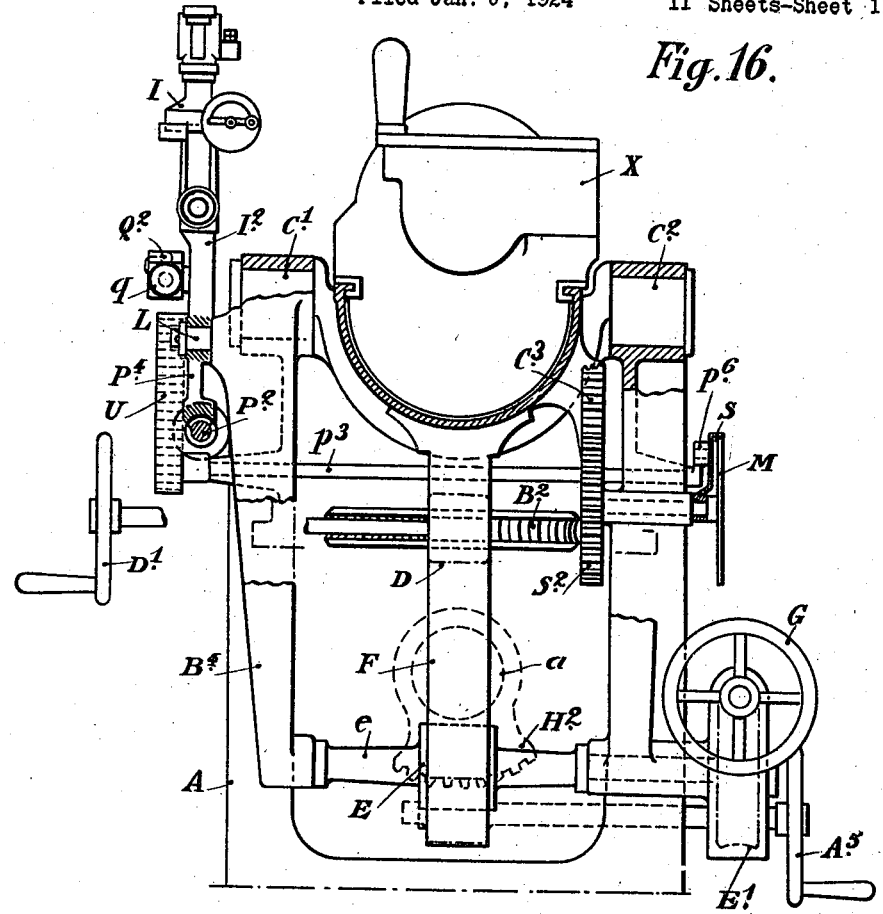
Fig. 16 is an end elevation partly in section.

The amplification of the angular motion imparted to the bracket $I^2$ of the sighting apparatus may be produced in a different way, for instance in the manner indicated in the embodiment illustrated in Figures 14, 15 and 16.

The distribution of the operations is the same as in the last two examples. The mechanism for effecting the uprighting of the bracket $I^2$ of the sighting apparatus is the same as in the example illustrated in Figures 8, 9 and 10, but in the present example the pin L carries a toothed sector U whose movements are positively co-ordinated with those of the bracket $I^2$, and which transmits its multiplied movements to a pinion $p^4$ fixed on an axle $p^3$ journalled in the side plates of the gun mount. The movements of this axle are transmitted to a jointed parallelogram $p^5$—$p^6$—S consisting of a lever $p^5$ fixed on the said axle $p^3$, a link $p^6$ and a lever parallel to the lever $p^5$, carrying at its free end a lever S bearing a pointer, said lever being loose on the shaft $S^1$. For this latter a bearing is formed on the right hand side plate of the gun mount. On the shaft $S^1$ is fixed a tangent-elevation plate M. The same shaft carries a pinion $S^2$ meshing with a toothed sector $C^3$ carried by the cradle C and having its centre on the axis of the cradle trunnions.

It will be perceived that the angular displacements imparted to the bracket $I^2$ of the sighting apparatus by means of the knurled head $p^2$ are transmitted, suitably multiplied by the transmission U—$p^4$, to the axle $p^3$, and thence through the jointed parallelogram $p^5$—$p^6$ to the pointer S of the tangent-elevation plate M. On the other hand it will be seen that the inclinations given to the cradle and gun barrel as a whole, around the axis of the trunnions of the latter, are transmitted to the tangent elevation plate, multiplied in the same ratio by means of the transmission $C^3$—$S^2$. In this constructional form the apparatus for indicating the tangent-elevation is considerably simplified.

Figure 17 illustrates in elevation a modification of the apparatus just described. In this example the mechanism for actuating the bracket $I^2$ of the sighting apparatus acts upon this bracket through the medium of a member carried by the axle $p^3$. The said member is constituted by a cam V which bears constantly upon an "appendix" $i^2$ of the bracket $I^2$, and has a contour such that for an angular displacement of the axle $p^3$, the cam produces an angular rise of the "appendix" $i^2$; this rise being simply a determined fraction of the angular displacement imparted to the axle $p^3$.

Having now particularly described and ascertained the nature of my said invention and in what manner the same is to be performed, I declare that what I claim is:—

1. In combination, a wheeled gun carriage, a gun mount swiveled on said carriage to swing about an axis extending longitudinally with respect to the gun, means for swinging the mount about said axis, a cradle trunnioned on said mount, sighting means, an elevation dial mounted to rotate about the axis of the cradle trunnions, and a support for said sighting means having a fixed mark co-operating with said dial, said support being journalled on one of the cradle trunnions.

2. In combination, a wheeled gun carriage, a gun mount swiveled on said carriage to swing about an axis extending longitudinally with respect to the gun, means for swinging the mount about said axis, a cradle trunnioned on said mount, an elevation dial mounted to rotate about the axis of the cradle trunnions, a support journalled on one of said trunnions and having a mark co-operating with said dial, and sighting means vertically pivoted on said support.

3. In combination, a wheeled gun carriage, a gun mount swiveled on said carriage to swing about an axis extending longitudinally with respect to the gun, means at one side of the gun for swinging the mount about said axis, a cradle trunnioned on said mount, means at the other side of said gun for elevating the same, sighting means, an elevation dial mounted to rotate about the axis of the cradle trunnions, and a support for said sighting means having a mark co-operating with said dial, said support being journalled on one of the cradle trunnions.

4. In combination, a wheeled gun carriage, a gun mount swiveled on said carriage to swing about an axis extending longitudinally with respect to the gun, means at one side of the gun for swinging the mount about said axis, a cradle trunnioned on said mount, means at the other side of the mount for training the gun, sighting means, an elevation dial mounted to rotate about the axis of the cradle trunnions, and a support for said sighting means having a mark cooperating with said dial, said support being journalled on one of the cradle trunnions.

5. In combination, a wheeled gun carriage, a gun mount swiveled on said carriage to swing about an axis extending longitudinally with respect to the gun, means at one side of the gun for swinging the mount about said axis, a cradle trunnioned on said mount, means at the other side of the gun for elevating and training the same, sighting means, an elevation dial mounted to rotate about the axis of the cradle trunnions, and a support for said sighting means having a mark co-operating with said dial, said support being journalled on one of the cradle trunnions.

6. In combination, a wheeled gun carriage, a gun mount swiveled on said carriage to swing about an axis extending longitudinally with respect to the gun, means at one side of the gun for swinging the mount about said axis, a cradle trunnioned on said mount, gun elevating, training and sighting means at the other side of the gun, an elevation dial mounted to rotate about the axis of the cradle trunnions, and a support for said sighting means having a mark co-operating with said dial, said support being journalled on one of the cradle trunnions.

In testimony whereof I have signed this specification.

EUGÈNE SCHNEIDER.

Witnesses:
ANDRÉ MOSTICKER,
LOUIS GARDET.